US 6,539,416 B1

(12) United States Patent
Takewaki et al.

(10) Patent No.: US 6,539,416 B1
(45) Date of Patent: Mar. 25, 2003

(54) MANAGING SYSTEM AND MANAGING METHOD OF MOBILE AGENT

(75) Inventors: Toshiaki Takewaki, Tokyo (JP); Soomi Kim, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/213,372

(22) Filed: Dec. 17, 1998

(30) Foreign Application Priority Data

Dec. 19, 1997  (JP) .............................................. 9-351002

(51) Int. Cl.⁷ .............................................. G06F 15/16
(52) U.S. Cl. ........................ 709/202; 709/206; 709/217; 709/300; 709/317
(58) Field of Search ................................ 709/202, 206, 709/217, 300, 317; 707/4, 10, 100–103

(56) References Cited

U.S. PATENT DOCUMENTS

| 5,603,031 A | * | 2/1997 | White et al. ................. 709/303 |
| 5,850,517 A | * | 12/1998 | Verkler et al. ............... 709/202 |
| 6,009,456 A | * | 12/1999 | Frew et al. .................. 709/202 |
| 6,065,039 A | * | 5/2000 | Paciorek ....................... 709/202 |
| 6,065,040 A | * | 5/2000 | Mima et al. ................. 709/202 |
| 6,085,222 A | * | 7/2000 | Fujino et al. ................ 709/202 |
| 6,085,240 A | * | 7/2000 | Suzuki et al. ................ 709/223 |
| 6,092,099 A | * | 7/2000 | Irie et al. ..................... 709/202 |
| 6,119,158 A | * | 9/2000 | Kawagoe ...................... 709/223 |
| 6,148,327 A | * | 11/2000 | Whitebread et al. ......... 709/202 |
| 6,172,986 B1 | * | 1/2001 | Watanuki et al. ........... 370/466 |
| 6,192,402 B1 | * | 2/2001 | Iwase .......................... 709/223 |
| 6,233,601 B1 | * | 5/2001 | Walsh .......................... 709/202 |
| 6,282,563 B1 | * | 8/2001 | Yamamoto et al. ......... 709/202 |

FOREIGN PATENT DOCUMENTS

JP          7-182174          7/1995

* cited by examiner

Primary Examiner—Saleh Najjar
(74) Attorney, Agent, or Firm—Finnegan, Henderson, Farabow, Garrett & Dunner, L.L.P.

(57) ABSTRACT

In a managing system of a mobile agent system, the mobile agent system comprises a plurality of agent systems for generating an agent, executing the agent and performing a movement processing of the agent, at least one agent holding server having an agent holding table, and a network connected thereto, and each of the plurality of agent systems has agent managing section to transfer the agent to the agent holding table of the agent holding server when the mobile agent system does not accept the agent in a case the agent is moved from the agent system under execution to the mobile agent system, and the agent holding server has server managing section to hold the agent in the agent managing table, and to move the agent when the mobile agent system can become accepting it.

22 Claims, 7 Drawing Sheets

PART OF ATTRIBUTE OF AGENT A
AGENT HOLDING SERVER POSITION : L
ITINERARY LIST : [AGENT CLIENT 11n]

AGENT A1 MAKING TO CHARACTER STRING AND
PART OF ATTRIBUTE OF AGENT A2

(a) "AGENT NAME (A1), ATTRIBUTE LIST ([ITINERARY LIST : [], ATTRIBUTE 1:1])"

(b) ATTRIBUTE OF AGENT A2
ITINERARY LIST : [P2]
ANOTHER DATA HOLDING : [ "AGENT NAME (A1), ATTRIBUTE LIST ([ITINERARY LIST : [], ATTRIBUTE 1:1])" ]

MANAGING SYSTEM AND MANAGING METHOD OF MOBILE AGENT

BACKGROUND OF THE INVENTION

The present invention relates to a managing system and a managing method of a mobile agent.

The mobile agent has aimed to perform appropriate processing in an appropriate place while accompanied by the movement of the code of the agent and the movement of data. The system construction with a high flexibility becomes possible by moving the agent, and continuing processing while communicating among the agents if necessary.

The application system created based on the mobile agent technology can be considered as a set of programs which activate in different computers. On the other hand, ones that mobility is given to the object based on a conventional object-oriented technology can be considered as an agent.

The mobile agent system is characterized with mobility. Therefore, the computer, which generates the agent, can be in a state of "Wait" until generated agent finish all work and return to the computer. That is, since it is unnecessary to activate the computer in the waiting state, the activation can be paused. However, in a case computer does not activate when the agent, who ended the round, intends to return the computer which generated the agent, a fact that the agent waits at the previous computer occurs, then, according to circumstances, the state, which the agents concentrates on a specific computer, occurs.

In the technology as mentioned above, when the agent cannot reach the final target computer since the agent moves not only data but also an own code to the itinerary, it is necessary to make the agent staying as it is. Therefore, there are disadvantages such as not being capable of activating a new agent with a small-scale computer which does not comprise the secondary memory or has the small memory capacity etc.

BRIEF SUMMARY OF THE INVENTION

An object of the present invention is to provide a managing system and a managing method of a mobile agent who can hold an agent temporarily without consuming a resource of a small-scale computer.

The managing system of the first mobile agent system according to the present invention wherein the mobile agent system comprises: a plurality of agent systems for generating an agent, executing the agent and performing a movement processing of the agent; at least one agent holding server having an agent holding table; and a network connected thereto, and wherein each of the plurality of agent systems has agent managing means to transfer the agent to the agent holding table of the agent holding server when the mobile agent system does not accept the agent in a case the agent is moved from the agent system under execution to the mobile agent system, and the agent holding server has server managing means to hold the agent in the agent managing table, and to move the agent when the mobile agent system can become accepting it. In the first agent managing system, each of the plurality of agent systems comprises: an agent transmitting and receiving section for transmitting and receiving the agent through the network; an agent storage section for holding an received agent; an agent manager for managing a generation of the agent, transmitting and receiving the agent, and an execution of the agent, and for moving the agent to the agent holding server specified by the agent when the mobile agent system can not accept the agent; and an agent execution section for executing a processing of the agent. A first method of managing the agent which has a plurality of agent systems for generating an agent, executing the agent and performing a movement processing of the agent; at least one agent holding server having an agent holding table; and a network connected thereto, according to the present invention comprises the steps of: transferring the agent to the agent holding table of the agent holding server when the mobile agent system does not accept the agent in a case the agent is moved from the agent system under execution to the mobile agent system; and moving the agent held in the agent managing table of the agent holding server to the mobile agent system when the mobile agent system can become acceptable.

By providing the agent holding server in the network of the mobile agent system, when the agent system, which is an itinerary of the agent, does not activate, the agent can be temporarily moved to the agent holding server. And, when the mobile agent system becomes in an activation state, by moving the agent, there is an advantage to be possible to make the processing of other agents executed preventing the agent on a small-scale computer from staying.

In the first agent managing system, each of the plurality of agent systems further comprises means for serializing and transferring the agent to the agent holding table of the agent holding server, when the mobile agent system can not accept the agent; and means for deserializing the serialized agent when the serialized agent serialized by the agent system is received through the agent holding server. In the first agent managing system, when the agent acceptance request is received from the mobile agent system, the agent holding server moves the agent to the mobile agent system stored in the agent holding table according to the request. In the method of managing the first agent, the steps of deactivating the own system until the agent issued by the agent system is processed by other agent systems connected with the network and returns; and confirming an existence of the agent moving to the own agent system for the agent holding server after the deactivated agent system starts, and requesting an itinerary of the agent are further provided. When the agent system which issues the agent deactivates and thereafter the system activates, it is possible to confirm whether the agent moving to an own agent system is returned to the agent holding server and request of movement of the agent. Therefore, the monitoring whether the agent system (That is, the target computer) with the agent holding server is activating becomes unnecessary.

In the first agent managing system, each of the plurality of agent systems further comprises means for serializing and transferring the agent to the agent holding table of the agent holding server, when the mobile agent system can not accept the agent; and means for deserializing the serialized agent when the serialized agent serialized by the agent system is received through the agent holding server. In the first method of managing the agent, the steps of: serializing the agent by the agent system under execution and transferring it to the agent holding table of the agent holding server when the mobile agent system can not accept the agent; and deserializing the agent by the mobile agent system, which receives the serialized agent from the agent holding server are further provided. Since only a state of the agent is serialized and moves to the agent holding server, and is deserialized when receiving a predetermined information, the consumption of the computer resource can be suppressed.

In the first agent managing system, the plural agent system further comprises: means for deactivating the system until the agent issued by the agent system is processed by other agent systems connected with the network, and returns; means for requesting an itinerary of the agent moving to an own agent system from the agent holding table of the agent holding server after the deactivated agent system activates the system; and means for deserializing the agent moving to the own agent system, which is moved from the agent holding server, and is serialized by another agent system while the agent system is in a deactivation state. In the first method of managing the agent, the steps of: deactivating the system until the agent issued by the agent system is processed by other agent systems connected with the network and then the agent returns; confirming an existence of the agent moving to the own agent system for the agent holding server after the deactivated agent system starts, and requesting an itinerary of the agent; and deserializing the agent moving to own agent system moved from the agent holding server and serialized by the other agent systems under deactivation of the system are further provided. When the agent system which issues the agent deactivates and thereafter the system activates, it is possible to confirm whether the agent moving to the own agent system is returned to the agent holding server and request of movement of the agent. Therefore, the monitoring whether the agent system, that is, the target computer, with the agent holding server is activating becomes unnecessary. Since only a state of the agent is serialized and moves to the agent holding server, and is deserialized when receiving a predetermined information, the consumption of the computer resource can be suppressed.

In the first agent managing system, the agent holding server regularly monitors the activation state of the mobile agent system, and, when it is judged that the agent system can be accepted, moves the agent to the mobile agent system stored in the agent holding table. In the first method of managing the agent, the activation state of the mobile agent system is regularly monitored by the agent holding server, and, when it is judged that the agent system can be accepted, the agent is moved to the mobile agent system stored in the agent holding table. When the target computer reactivates, by regularly inquiring of the itinerary target computer from the agent holding server, the agent can be moved to the target computer without requesting the itinerary of the agent by the user.

In the first agent managing system, the agent has an information showing a position of the agent holding server, and the agent system under execution moves the agent to the agent holding server according to the position information. In the first method of managing the agent, the agent is moved to the agent holding server according to a position information of the agent holding server provided in the agent. By providing the position information of the agent holding server in the agent, the agent holding server can be easily specified.

In the first agent managing system, the plural agent system further comprises: means for checking whether a plurality of agents to be move to the mobile agent system exist, and for moving to the mobile agent system by bringing the plurality of agents together in one agent according to the result. In the first method of managing the agent, the step of: checking whether a plurality of agents to be move to the mobile agent system exist, and moving to the mobile agent system by bringing the plurality of agents together in one agent according to the result is further provided. By bringing the itinerary to the itinerary target computer together, the plurality of transfer sequences (itinerary processings) can be collectively performed to one sequence.

In the second agent managing system according to the present invention, the mobile agent system comprises a plurality of agent system for executing an agent, generating the agent, and moving the agent, and a network connected thereto, and wherein each of the plurality of agents system comprises: means for serializing only an internal state of the plurality of agents when there are a plurality of agents of the same itinerary in the agent system under execution, and making another agent hold the serialized agents in the agent system under execution together; and agent transfer means for moving the agent brought together by the means to the following agent system by a transfer once. In the second method of managing the agent of a mobile agent system which has a plurality of agent systems for generating an agent, executing the agent and performing a movement processing of the agent; and a network connected thereto, comprises the steps of: serializing only an internal state of the plurality of agents when there are a plurality of agents of the same itinerary in the agent system under execution, and making another agent hold the serialized agents in the agent system under execution together; and moving the agent brought together to the following agent system by a transfer once. The transfer cost and the network load can be reduced since the itinerary of a plurality of agents is brought together in one agent and is transferred even in a case of the mobile agent managing system without the agent holding server.

In the third agent managing system according to the present invention, the mobile agent system comprises a plurality of agent system for executing an agent, generating the agent, and moving the agent, and a network connected thereto, and wherein each of the plurality of agents system comprises: means for serializing only an internal state the agent, and for making another agent in the agent system under execution hold collectively the serialized agents, when a mobile agent system does not activated in spite of completing a processing of the agent with the agent system under execution; means for moving the agents to the mobile agent system of the another agent; and agent transfer means for deserializing the serialized agents and moving them, when the deactivated agent system activates. In the third method of managing the agent, of a mobile agent system which has a plurality of agent systems for generating an agent, executing the agent and performing a movement processing of the agent; and a network connected thereto, comprises the steps of: serializing only an internal state the agent, and for making another agent in the agent system under execution hold collectively the serialized agents, when a mobile agent system does not activated in spite of completing a processing of the agent with the agent system under execution; moving the agents to the mobile agent system of the another agent; and deserializing the serialized agents and moving them to the agent system, when the deactivated agent system activates. The transfer cost and the network load can be reduced since the itinerary of a plurality of agents is brought together in one agent and is transferred even in a case of the mobile agent managing system without the agent holding server. Moreover, when the itinerary target computer is deactivating, a lot of agents can be prevented from staying in a specific activation computer by making another agent hold the state.

By the above-mentioned structure, even when the agent system, which intends to move the agent, is deactivated, it becomes possible to make the processing of other agents executed preventing the agent from staying on a small-scale computer by temporarily moving and holding the agent to a specific agent holding server. The throughput of the system can be improved besides the resource can be used effectively.

As mentioned above, the present invention provides and constructs the managing system and the managing method of the mobile agent who can hold the agent temporarily without consuming the resource of a small-scale computer. The present invention is not limit to the above-mentioned system and method, and may be is provided by a record medium where the program to achieve the first to third method of managing the mobile agent is recorded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
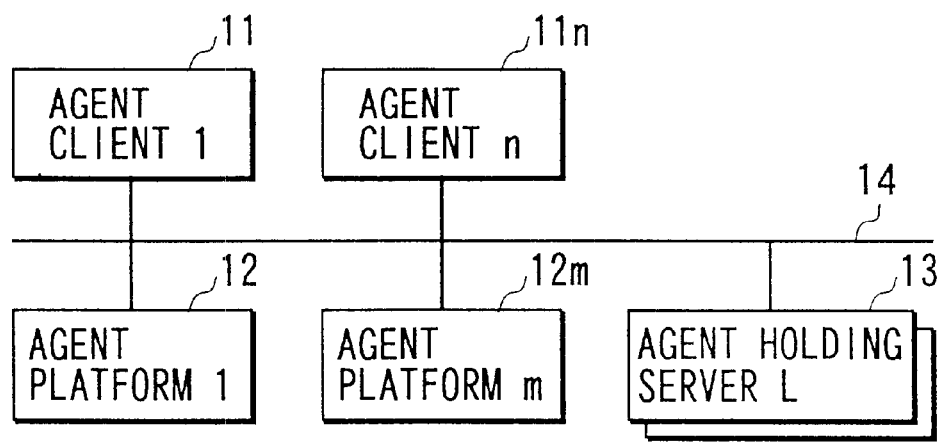
FIG. 1 is a block diagram which shows an embodiment of the present invention.

FIG. 1 is a block diagram which shows an embodiment of the managing system of the mobile agent of the present invention. Specifically, FIG. 1 shows an operation manner when a status of the agent is managed. In the managing system of the mobile agent according to the present invention, agent clients 11 to 11n, agent platforms 12 to 12m, and an agent holding server 13 are connected through a network 14 as shown in FIG. 1. The agent issued from the agent clients 11 to 11n itinerate the agent platform 12 to 12m through the network 14, and finally return to the agent clients 11 to 11n. The agent holding server 13 is a storage section to hold the agent temporarily.

The difference between the agent clients 11 to 11n and the agent platforms 12 to 12m is a difference whether the user can activate (issue) the agent, and when both of them are not distinguished, it will be called an agent system 11.

Figure 2:
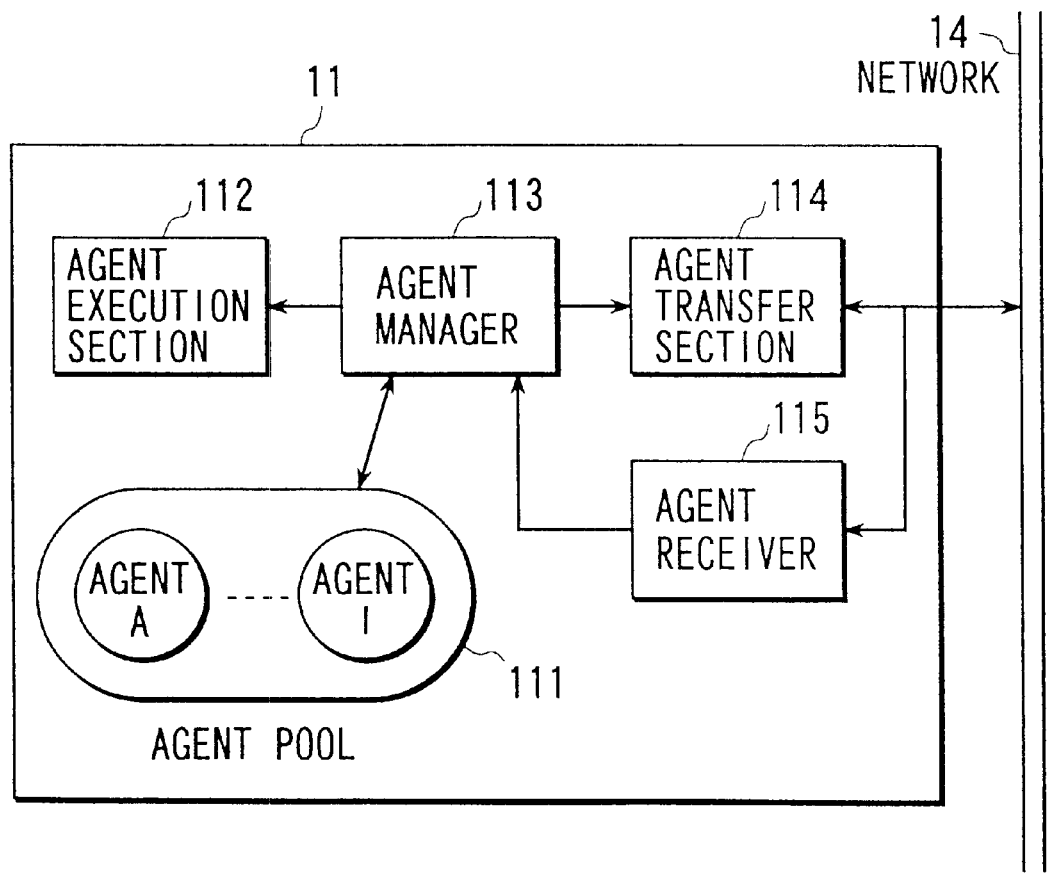
FIG. 2 is a block diagram which shows an example of the structure of the agent system in FIG. 1.

FIG. 2 shows an internal structure of the agent system 11. The agent system 11 has an agent pool 111 where the agent is saved, an agent execution section 112 which executes the agent, an agent manager 113, an agent transfer section 114, and an agent receiver 115. All agents are held in the agent pool 111.

An operation of each section of the agent system constructed as described above will be briefly explained. The agent manager 113 judges advisability of the execution of the agent, and drives the agent execution section 112. The agent execution section 112 executes the agent based on the instruction of the agent manager 113. The agent sent from an outside agent system is taken through the agent receiver 115, and is stored in the agent pool 111 under the control of the agent manager 113. The agent to be generated or transferred to outside in the agent system 11, is sent to the network 14 under management by the agent manager 113 through the agent transfer section 114.

Figures 3, 4:
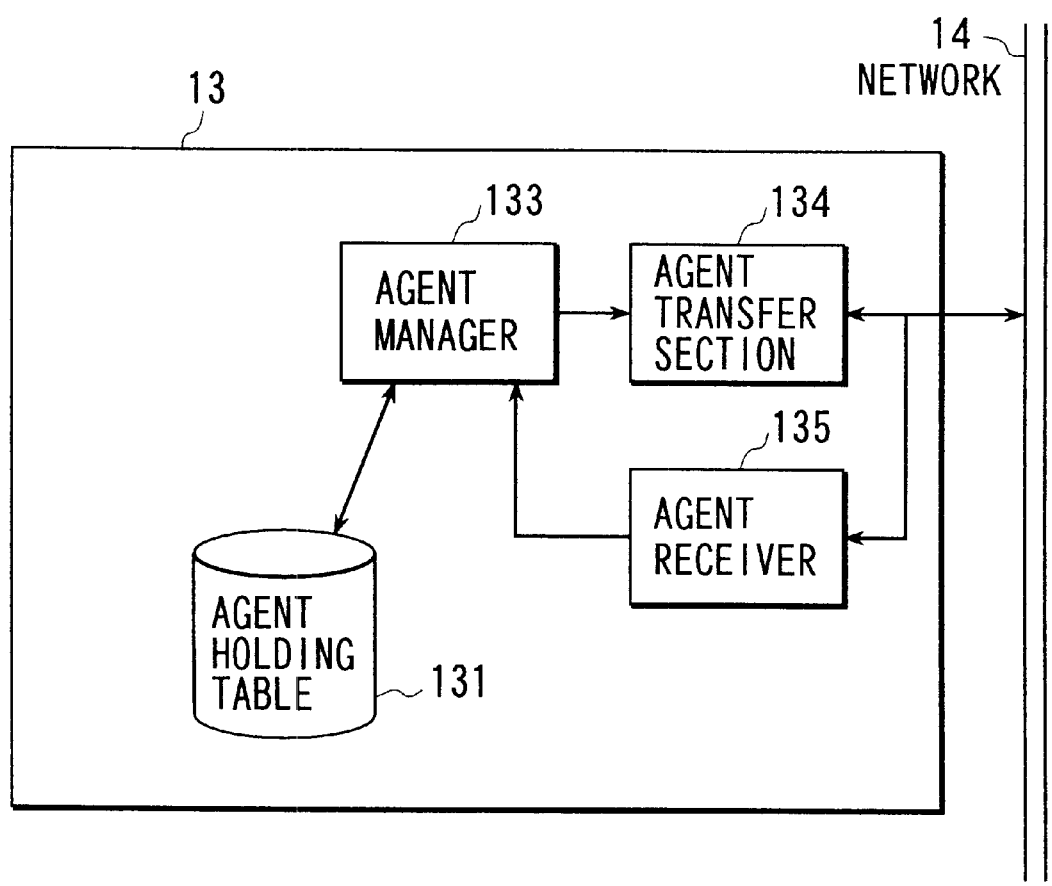
FIG. 3 is a block diagram which shows an example of the structure of the agent holding server in FIG. 1.
FIG. 4 shows a part of the attribute of the agent to explain the operation of the embodiment of the present invention.
Figure 5:
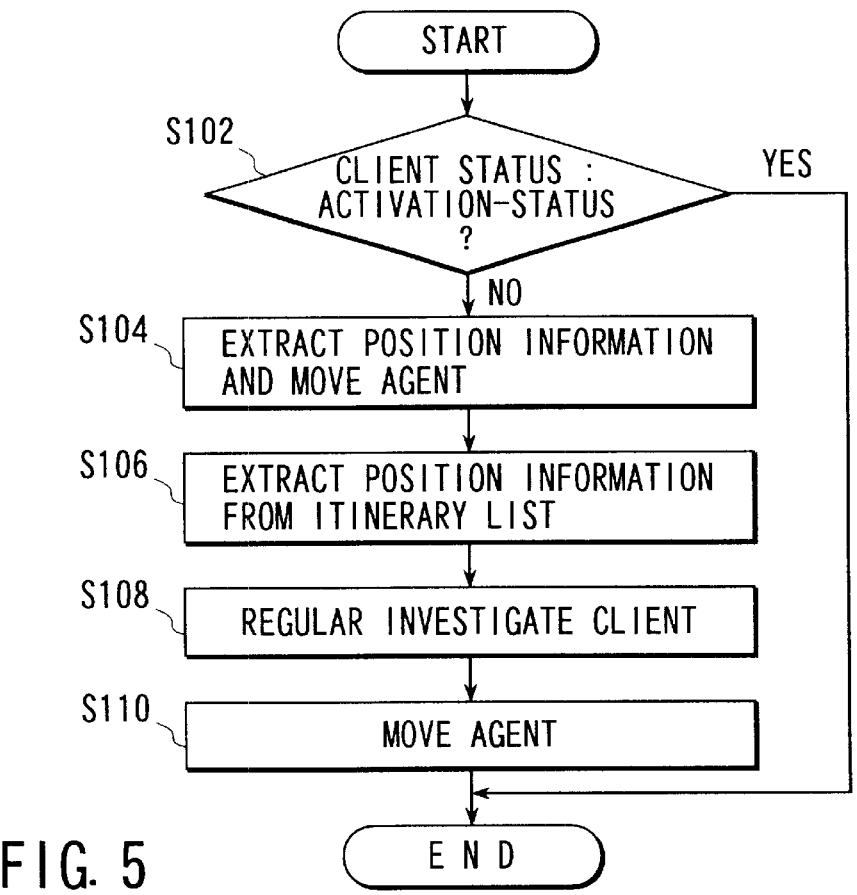
FIG. 5 is a flowchart to explain the operation of (example 1) according to the embodiment.
Figure 6:
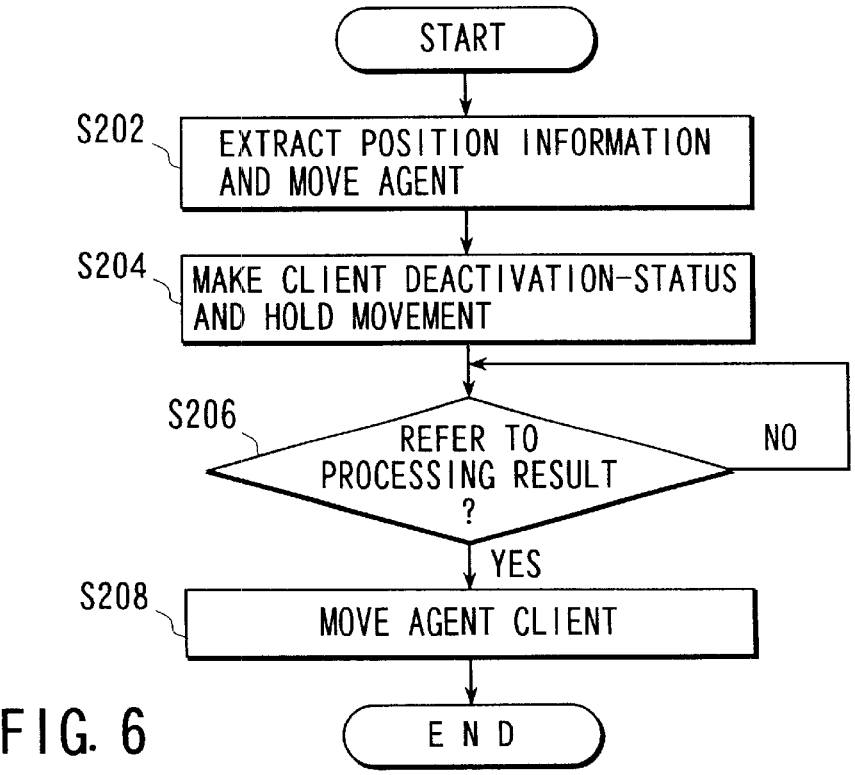
FIG. 6 is a flowchart to explain the operation of (example 2) according to the embodiment.
Figure 7:
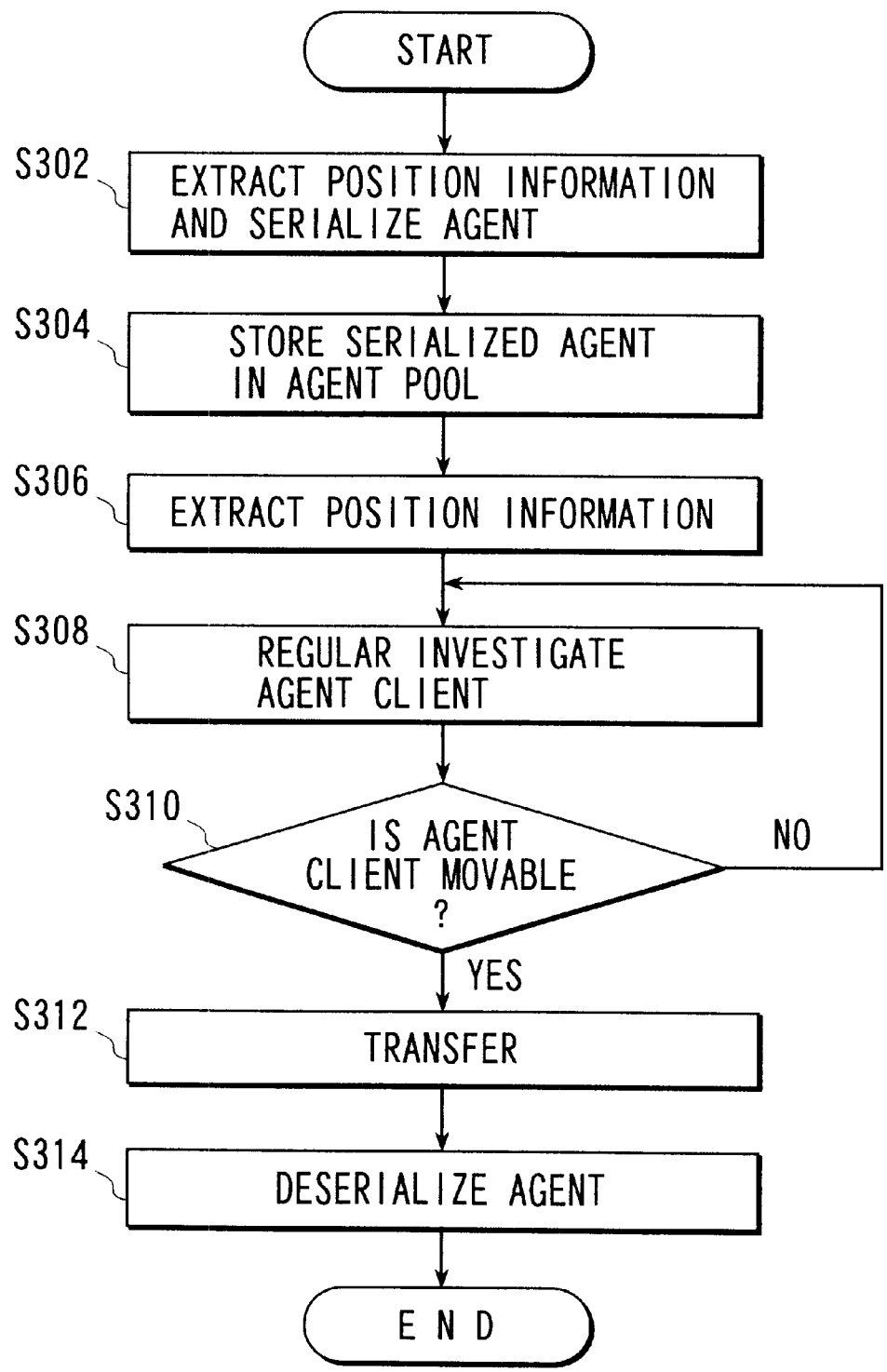
FIG. 7 is a flowchart to explain the operation of (example 3) according to the embodiment.
Figure 8:
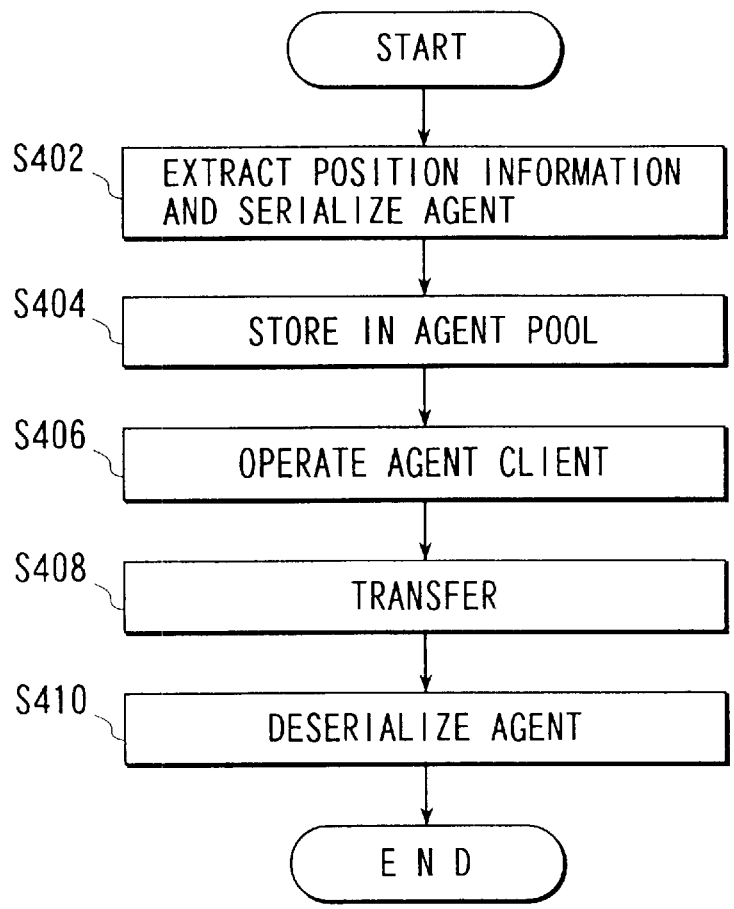
FIG. 8 is a flowchart to explain the operation of (example 4) according to the embodiment.

FIG. 3 shows an internal structure of the agent holding server 13. The agent holding server 13 temporarily holds the agent and manages the held agent when the mobile agent system is deactivated in the agent system, that is, when the mobile agent is in a state that the agent cannot move to the target agent system. The agent holding server 13 has an agent holding table 131 which manages the held agent, an agent manager 133, an agent transfer section 134, and an agent receiver 135. Since the agent holding server 13 does not execute the agent, the agent holding server 13 does not have the part which corresponds to the agent execution section 112 in the agent system 11.

Hereinafter, an operation of the first embodiment of present invention will be explained.

A case where an agent A has the following information to understand the embodiment of the present invention more easily is assumed. First, the agent A holds a position information on the agent holding server 13. That is, the agent A has the position information L as a position information on the agent holding server 13 as shown in FIG. 4. It is assumed the agent client 11n is specified for the following itinerary of the agent A. In this case, a position information of the specific agent holding server for every agent systems can be held as a holding method of the position information in the agent holding server. Moreover, since the agent holding server 13 need not be one, it may also become possible to manage by the list etc. to specify plural agent holding servers 13.

Hereafter, four examples are shown when managing the agent according to the first embodiment of the present invention, is managed, and will be explained referring to the flowcharts shown in FIG. 5 to FIG. 8.

EXAMPLE 1

FIG. 5

When the agent client 11n is not activated in a case the agent A intends to move from the agent platform 12m to the agent client 11n (step S102), the agent platform 12m extracts the position information L on the agent holding server 13 held by the agent A, and the agent A is moved to the agent holding server 13 (step S104). The agent holding server 13 extracts the position information about the agent system to which agent A should move, essentially from the itinerary list which agent A holds (step S106). Here, the agent client 11n is taken out. Then, the agent holding server 13 regularly checks the state of the agent client 11n which is the agent system of the target (step S108). The agent holding server 13 moves the agent A to the agent client 11n if the agent client becomes possible to move (step S110).

EXAMPLE 2

FIG. 6

In this example, the agent client 11n is assumed to deactivate the system because it takes time until the issued agent A returns. At this time, since the agent client 11n does not activate when agent A is going to move from the agent platform 12m to the agent client, the agent platform 12m extracts the position information about the agent holding server at which the agent A is held, and moves the agent A to the agent holding server 13 (step S202). The agent client 11n holds the movement of the agent to the agent holding server 13 when the client does not activate (step S204). When the user observes the processing result of the agent A (step S206), the agent client 11n is activated (step S208). At this time, the agent client 11n checks whether the agent holding server holds the agent moving to the own agent system. Since the agent A is held in the agent holding server 13, in this example, the agent client 11n requests the agent holding server 13 to move the agent A to the agent client 11n. The agent holding server 13 moves the agent A to the agent client 11n.

EXAMPLE 3

FIG. 7

When the agent A is going to move from the agent platform 12m to the agent client, a case where the agent client does not activate is assumed, in this example. The agent platform 12m extracts the position information on the agent holding server at which the agent A is held, and serializes an internal state of the agent A (step S302). For example, serialization of the internal state is performed by the method of making the value of such as the variable in the agent a character string. And, only the serialized internal state of the agent A is transferred to the agent holding server 13. The agent holding server 13 stores the serialized state of the agent A in the agent holding table 131 (step S304). And, the agent holding server 13 extracts the position information about the agent system to which agent A should move, essentially from the itinerary list in the serialized state of the agent A (step S306). Here, the agent client 11n is taken out. Then, the agent holding server 13 regularly checks the state of the agent client 11n which is the agent system of the target (step S308). The agent holding server 13 transfers the serialized state of the agent A read from the agent holding table 131 to the agent client 11n (step S312), if the agent client 11n is activated (YES in step S310). The agent client 11n deserializes the agent A in the serialized state and activates as a usual agent (step S314).

EXAMPLE 4

FIG. 8

The agent client 11n is assumed to deactivate the system because it takes time until the issued agent A returns. Since the agent client 11n does not activate when the agent A is going to move from agent platform 12m to the agent client, the agent platform 12m extracts the position information about the agent holding server 13 at which the agent A is held, and serializes an internal state of the agent A (step S402). For example, serialization of the internal state is performed by the method of making the value of such as the variable in the agent a character string. And, only a serialized internal state is transferred to and is held by the agent holding server 13.

The agent holding server 13 stores the serialized state of the agent A in the agent holding table 131 (step S404). The agent client 11n has a knowledge that the agent moves to the agent holding server 13 when the corresponding client does not activate. When the user observes the processing result of the agent A, the agent client 11n is activated (step S406). At this time, the user client 11 checks whether the agent holding server 13 holds the agent moving to the own agent system. Since the serialized state of the agent A is held in the agent holding server 13 in this example, the agent client 11n requests the agent holding server 13 to transfer the serialized state of the agent A read from the agent holding table 131 to the agent client 11n. The agent holding server 13 transfers the serialized state of the agent A to the agent client 11n. The agent client 11n deserializes the agent A in the serialized state and makes the deserialized agent the activation as a usual agent (step S410).

According to the above-mentioned example 1 to example 4, even when the agent system, which intends to move the agent, is deactivated, it becomes possible to execute the processing of other agents by preventing the agent from staying on a small-scale computer by temporarily moving and holding the agent on a specific agent holding server.

According to above-mentioned example 1 to example 4, even when the agent system, which intends to move the agent, is deactivated, it becomes possible to make the processing of other agents executed preventing the agent from staying on a small-scale computer by temporarily moving and holding the agent to a specific agent holding server.

The second embodiment of the present invention will be explained.

Since the structure when the agent is managed is similar to FIG. 1 and FIG. 2, the explanation here will be omitted in the meaning by which repetition is avoided.

Figure 9:
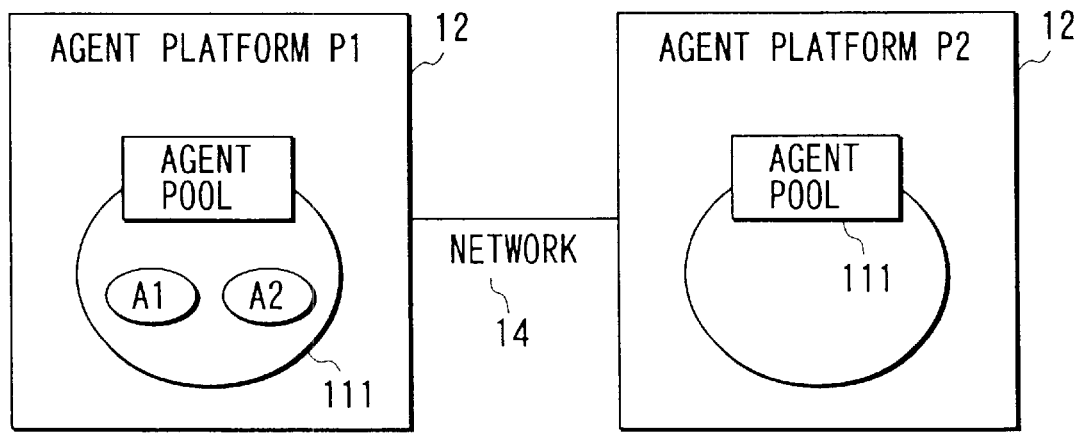
FIG. 9 shows another embodiment of the present invention.

Here, it is assumed the following state to explain easily. It is assumed the agents A1 and A2 move from the agent platform P1 to the agent platform P2 in FIG. 9. Moreover, it is assumed only the agent shown in figure to omit the explanation of other agents. The agent platform P2 is assumed to be specified as next itinerary for the agents A1 and A2.

Figures 10, 11:
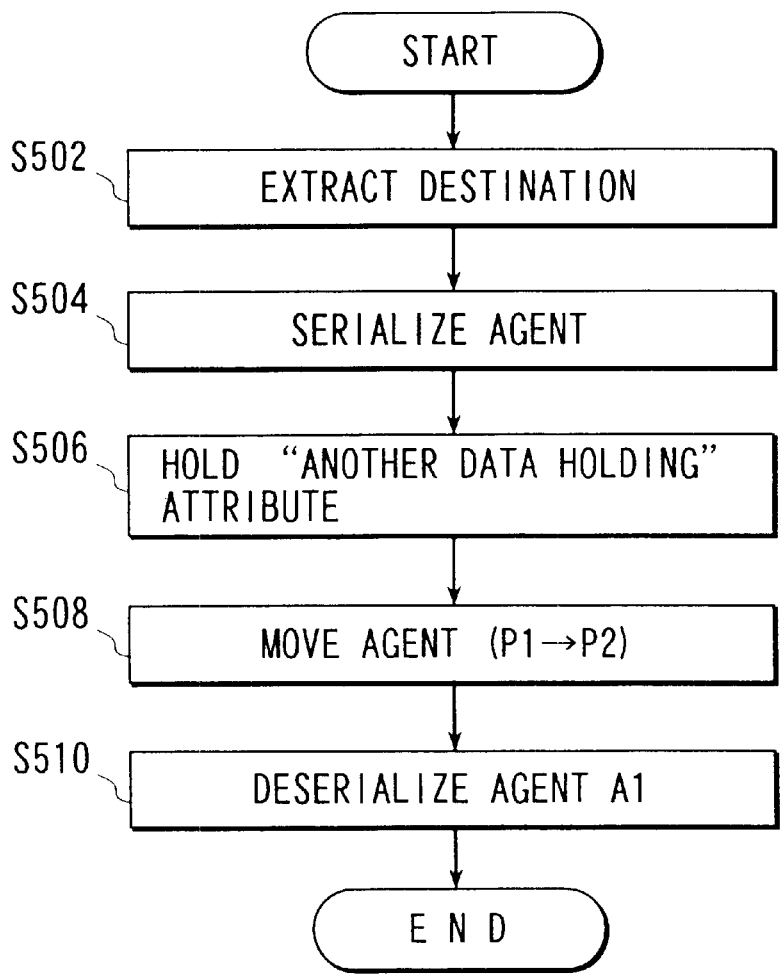
FIG. 10 is a flowchart to explain the operation of (example 5) according to the embodiment.
FIG. 11 a part of the attribute of the agent to explain the operation of another embodiment of the present invention.

Hereafter, two examples are shown to explain the second embodiment of the present invention referring to the flow-charts shown in FIG. 10 to FIG. 13. FIG. 11 shows a part of the attribute of the mobile agents A1 and A2.

EXAMPLE 5

FIG. 10

It is considered the state which the agent A1 moves in the agent platform P1. At this time, the itinerary list of the agent in the agent platform P1 is checked, and the agent of the same itinerary is extracted (step S502). In this example, the agent A2 is extracted. Here, the agent platform P1 decides to serialize an internal state of the agent A1 (step S504). In this case, since serialized agent is arbitrarily decided, the agent A2 may be serialized. Serialization is performed by making an internal state a character string.

Figures 12, 13:
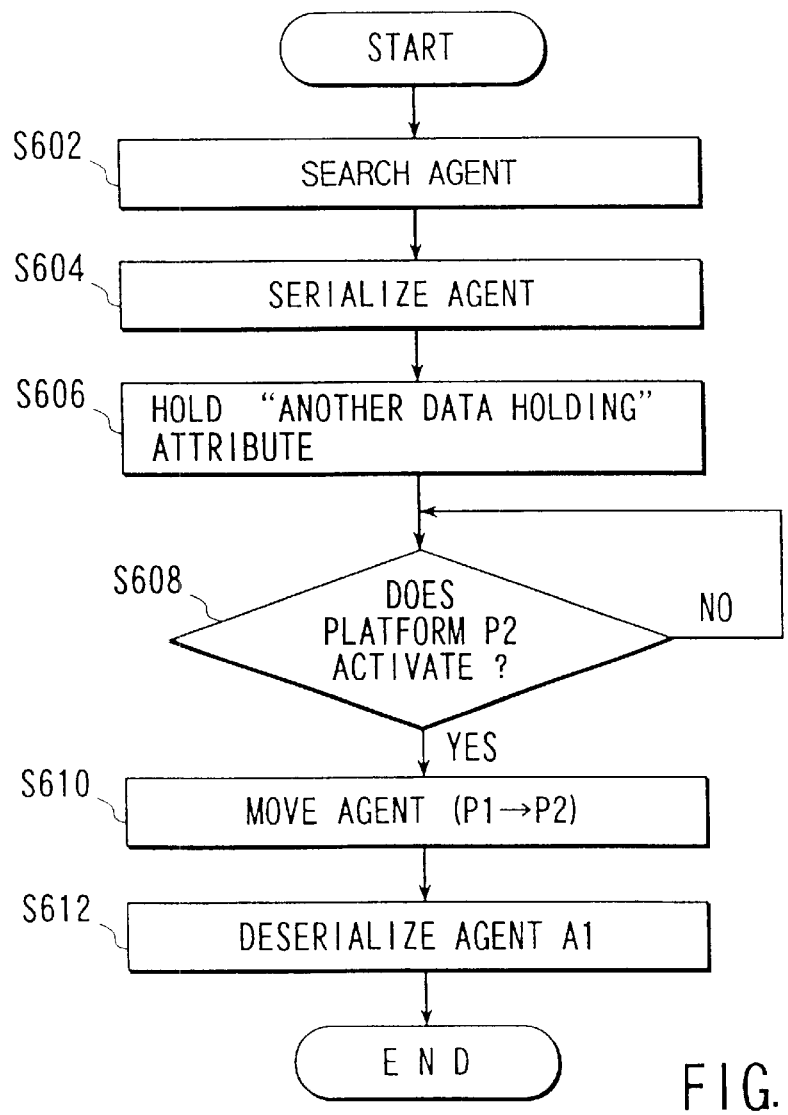
FIG. 12 shows making to a character string and a part of the attribute of the agent to explain the operation of another embodiment of the present invention.
FIG. 13 is a flowchart to explain the operation of (example 6) according to the embodiment.

The itinerary list of agent A1 shown in FIG. 11 becomes a character string shown in (a) of FIG. 12 if it is not changed except for emptying the list. This is held in the "Another data holding" attribute of the agent A2 shown in (b) of FIG. 12 (step S506). Thereby, when the agent A2 moves from the platform P1 to the platform P2, the agent A1 also will move at the same time (step S508). When the agent A2 has moved to the agent platform P2, an internal state of the agent A1 held by agent A2 is deserialized and is returned to the agent pool (step S510). Thereafter, the agent A1 and A2 perform usual processing.

EXAMPLE 6

FIG. 13

Next, it is considered the state which the agent A1 in the agent platform P1 moves to the agent platform P2. When the agent platform P2 does not activate, the following processing is performed.

First, an arbitrary agent in agent platform P1 is searched (step S602). Since only the agent A2 exists besides the agent A1 in this example, the agent A2 is uniquely decided. Next, the agent platform P1 serializes an internal state of the agent A1 (step S604). As is similar to previous example 5, in the itinerary list, one agent platform is removed from the itinerary list if the agent, who moves to the same itinerary, is selected, but if not so, the itinerary list is not changed. In this example, since the agent A2 also moves to the agent platform P2 after processing, the agent platform P2 is removed from the itinerary list of agent A1. In this case, serialization is performed by a character string shown in (a) of FIG. 12 as well as the previous example 5. This is held in "Another data holding" attribute of the agent A2 shown in (b) of FIG. 12 (step S606). As a result, the plurality of agent can be brought to a single agent together.

Next, it is considered a case the agent A2 moves from the platform P1 to the platform P2. The movement waits until activating the platform P2 (step S608), since the agent necessary to serialize and hold does not exist in the platform P1 when the platform P2 does not activate. The agent A2 is transferred to the platform P2 by the usual transfer means when the platform P2 activates (step S610). The platform P2 which receives he agent A2 deserializes an internal state of the agent A1 held by the agent A2 and returns to the agent pool (step S612). Thereafter, the agent A1 and A2 perform usual processings.

According to above-mentioned example 5 and example 6, since plurality of agents are transferred by bringing the movement of a plurality of agents together in a single agent, the advantage, by which the cost of the transfer and the network load are decreased, and a lot of agents are prevented from staying in a specific computer, can be achieved.

The present invention can be achieved by middleware and the content is provided by optical disks such as a hard drive, a CD-ROM, and an MO.

Additionally, the present invention can be variously adopted without changing the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A managing system of a mobile-type agent system, wherein said mobile-type agent system comprises:

a plurality of agent systems for generating an agent, executing the agent and performing a movement processing of the agent;

at least one agent holding server having an agent holding table; and a network connected thereto, and wherein each of said plurality of agent systems has agent managing means to transfer said agent to said agent holding table of said agent holding server when a next one of said agent systems does not accept said agent in a case said agent is going to be moved from a current one of the agent systems to said next agent system, and said agent holding server has server managing means to hold said agent in said agent managing table, and to move said agent when said next agent system can accept said agent.

2. A managing system of a mobile-type agent system according to claim 1, wherein said plurality of agent systems includes an agent client and an agent platform.

3. A managing system of a mobile-type agent system according to claim 1, wherein each of said plurality of agent systems comprises:

means for deactivating a first agent system which issues said agent first, until the issued agent is processed by other agent systems connected with said network and returns to the first agent system; and means for confirming a presence of said agent moving to the first agent system to said agent holding server after reactivating the first agent system, which issues the agent first, and requesting movement of the agent.

4. A managing system of a mobile-type agent system according to claim 1, wherein each of said plurality of agent systems further comprises:

means for serializing said agent by a predetermined agent system and transferring said agent to said agent holding table of said agent holding server, when said next agent system can not accept the agent; and means for deserializing said serialized agent when said serialized agent is received through said agent holding server.

5. A managing system of a mobile-type agent system according to claim 1, wherein said plurality of agent systems further comprises:

means for deactivating the first agent system which issues said agent first until the issued agent is processed by other agent systems connected with said network, and returns to the first agent system;

means for requesting an itinerary of said agent moving to the first agent system from said agent holding table of said agent holding server after the first agent system issuing the agent first reactivates; and means for deserializing said agent moving to the first agent system when said agent has been serialized by another agent system.

6. A managing system of a mobile-type agent system according to claim 1, wherein each of said plurality of agent systems comprises:

an agent transmitting and receiving section for transmitting and receiving said agent through said network;

an agent storage section for holding a received agent;

an agent manager for managing a generation of the agent, transmitting and receiving the agent, and an execution of the agent, and for moving the agent to said agent holding server, when said next agent system can not accept the agent; and an agent execution section for executing a processing of said agent.

7. A managing system of a mobile-type agent system according to claim 1, wherein when an agent acceptance request is received from said next agent system, said agent holding server moves said agent to said next agent system stored in said agent holding table according to the request.

8. A managing system of a mobile-type agent system according to claim 1, wherein
said agent holding server regularly monitors the activation state of said next agent system, and, when it is judged that said next agent system can accept said agent, moves said agent stored in said agent holding table to said next agent system.

9. A managing system of a mobile-type agent system according to claim 1, wherein
said agent has an information showing a position of said agent holding server, and the first agent system moves said agent to said agent holding server according to said position information.

10. A managing system of a mobile-type agent system according to claim 1, wherein
said plural agent system further comprises:
means for checking whether a plurality of same agents are to be moved to said next agent system exist, and for moving to said next agent system by bringing the plurality of agents together in one agent when the plurality of same agents exist.

11. A managing system of a mobile-type agent system, wherein
said mobile-type agent system comprises a plurality of agent systems for executing an agent, generating the agent, and moving the agent, and a network connected thereto, and wherein
each of said plurality of agent systems comprises:
means for serializing only an internal state of said plurality of agents when there are a plurality of agents of the same itinerary in a current one of the agent systems, and holding together the serialized states in a first one of the agents; and
agent transfer means for moving the first agent to a next agent system by single transfer operation.

12. A managing system of a mobile agent system, wherein
said mobile-type agent system comprises a plurality of agent systems for executing an agent, generating the agent, and moving the agent, and a network connected thereto, and wherein each of said plurality of agent systems comprises:
means for serializing and for making another agent in the agent system hold collectively said serialized agents, when a next agent system is deactivated in spite of completing a processing of the agent;
means for moving said agents to another one of the agent systems; and
agent transfer means for deserializing the serialized agents and moving them, when the deactivated said next agent system activates.

13. A method of managing an agent of a mobile-type agent system which has a plurality of agent systems for generating an agent, executing the agent and performing a movement processing of the agent; at least one agent holding server having an agent holding table; and a network connected thereto, comprising the steps of:
transferring said agent to said agent holding table of said agent holding server when a next agent system does not accept said agent in a case said agent is moved from one of the agent systems to said next agent system; and
moving said agent held in said agent holding table of said agent holding server to said next agent system when said next agent system can accept said agent.

14. A method of managing an agent of a mobile-type agent system according to claim 13, further comprising the steps of:
deactivating a first agent system which issues said agent first, until the issued agent is processed by other agent systems connected with said network and returns to the owner agent system; and
confirming an existence of the agent moving to the first agent system for said agent holding server after reactivating the first agent system, and requesting an itinerary of the agent.

15. A method of managing an agent of a mobile-type agent system according to claim 13, further comprising the steps of:
serializing said agent by a predetermined one of the agent systems and transferring the serialized agent to said agent holding table of said agent holding server when a next agent system can not accept the agent; and
deserializing said serialized agent from said agent holding server by said next agent system, which can accept said agent.

16. A method of managing an agent of a mobile-type agent system according to claim 13, further comprising the steps of:
deactivating the first agent system which issues said agent first until the issued agent is processed by other agent systems connected with said network, and returns to the first agent system;
confirming an existence of the agent moving to the first agent system for said agent holding server after reactivation, and requesting an itinerary of the agent; and
deserializing the agent moving to the first agent system serialized by another one of the plurality of agent systems.

17. A method of managing an agent of a mobile-type agent system according to claim 13, wherein
said agent holding server, which receives an agent acceptance request from said next agent system, moves said agent stored in said agent holding table according to the request to said next agent system.

18. A method of managing an agent of a mobile-type agent system according to claim 13, wherein
the activation state of said next agent system is regularly monitored by said agent holding server, and, when it is judged that said next agent system can accept said agent, said agent stored in said agent holding table is moved.

19. A method of managing an agent of a mobile agent system according to claim 13, wherein
said agent is moved to said agent holding server according to a position information of said agent holding server provided in said agent.

20. A method of managing an agent of a mobile-type agent system according to claim 13, further comprising the step of:
checking whether a plurality of agents to be moved to said next agent system exist, and moving to said next agent system by bringing the plurality of agents together in one agent when the plurality of agents have a common itinerary.

21. A method of managing an agent of a mobile-type agent system which has a plurality of agent systems for generating an agent, executing the agent and performing a movement processing of the agent; and a network connected thereto, comprising the steps of:

serializing only an internal state of said plurality of agents when there are a plurality of agents of the same itinerary in one of the agent systems under execution, and holding the serialized agents together in one of the agents; and moving the agent brought together to a next agent system by a single transfer operation.

22. A method of managing an agent of a mobile-type agent system which has a plurality of agent systems for generating an agent, executing the agent and performing a movement processing of the agent; and a network connected thereto, comprising the steps of:

serializing only an internal state of the agent, and holding another agent when a next agent system is not activated in spite of completing a processing of the agent with one of the agent systems; and deserializing the serialized agents and moving them to the next agent system, when the next agent system activates.

* * * * *

UNITED STATES PATENT AND TRADEMARK OFFICE
CERTIFICATE OF CORRECTION

PATENT NO. : 6,539,416 B1
DATED : March 25, 2003
INVENTOR(S) : Takewaki et al.

It is certified that error appears in the above-identified patent and that said Letters Patent is hereby corrected as shown below:

<u>Title page,</u>
Item [57], ABSTRACT,
Line 9, "in a case" should read -- in case --.
Line 14, "become accepting" should read -- accept --.

<u>Column 10,</u>
Line 10, "in a case" should read -- in case --.
Lines 38 and 67, "can not" should read -- cannot --.

<u>Column 11,</u>
Line 43, "mobile" should read -- mobile-type --.
Line 66, "in a case" should read -- in case --.

<u>Column 12,</u>
Line 21, "can not" should read -- cannot --.

Signed and Sealed this

Tenth Day of June, 2003

JAMES E. ROGAN
*Director of the United States Patent and Trademark Office*